(12) United States Patent  (10) Patent No.: US 7,800,750 B2
Bustamante et al.  (45) Date of Patent: Sep. 21, 2010

(54) OPTICAL TRAP UTILIZING A REFLECTING MIRROR FOR ALIGNMENT

(75) Inventors: Carlos J. Bustamante, Berkeley, CA (US); Steven B. Smith, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 595 days.

(21) Appl. No.: 11/840,875

(22) Filed: Aug. 17, 2007

(65) Prior Publication Data

US 2007/0284516 A1  Dec. 13, 2007

Related U.S. Application Data

(63) Continuation-in-part of application No. 10/943,709, filed on Sep. 17, 2004, now Pat. No. 7,274,451.

(60) Provisional application No. 60/504,067, filed on Sep. 19, 2003.

(51) Int. Cl.
G01N 21/01 (2006.01)
G01N 15/02 (2006.01)
G01B 11/00 (2006.01)
G01B 11/14 (2006.01)

(52) U.S. Cl. .................. 356/244; 356/335; 356/337; 356/399; 356/614

(58) Field of Classification Search .......... 356/399–401
See application file for complete search history.

(56) References Cited

U.S. PATENT DOCUMENTS

| | | | |
|---|---|---|---|
| 4,234,788 A | 11/1980 | Palmer et al. | |
| 4,512,036 A | 4/1985 | Laor | |
| 4,844,617 A * | 7/1989 | Kelderman et al. | 356/624 |
| 4,893,886 A * | 1/1990 | Ashkin et al. | 359/350 |
| 4,927,268 A | 5/1990 | Carr et al. | |
| 5,079,169 A | 1/1992 | Chu et al. | |
| 5,100,627 A * | 3/1992 | Buican et al. | 422/108 |
| 5,445,011 A * | 8/1995 | Ghislain et al. | 73/105 |
| 5,727,098 A | 3/1998 | Jacobson | |

(Continued)

OTHER PUBLICATIONS

Ashkin, A.; Acceleration and Trapping of Particles by Radiation Pressure; Physical Review Letters, vol. 24, No. 4; Jan. 26, 1970; pp. 156-159.

Buican, Tudor N. et al.; Optical Trapping, Cell Manipulation, and Robotics; A Reprint from the Proceedings of SPIE—The International Society for Optical Engineering; vol. 1063; New Technologies in Cytometry Jan. 19-20, 1989, pp. 190-197.

(Continued)

*Primary Examiner*—Gregory J Toatley, Jr.
*Assistant Examiner*—Jarreas C Underwood
(74) *Attorney, Agent, or Firm*—DLA Piper LLP (US)

(57) ABSTRACT

An optical trap (and alignment device) having a light source for generating first and second light beams, and a pair of lenses for focusing the light beams to a trap region in a counter-propagating manner for trapping a particle in the trap region. A light source illuminates the trap region with a third beam of light, and a camera is positioned for capturing a portion of each of the first, second and third light beams. Actuators exert forces on generally rigid portions of optical fiber used to deliver the first and second light beams to the trap region, such that the generally rigid portions pivot about pivot points located at supported members from which the optical fibers extend. Position sensitive detectors measure the position of the beams leaving the optical fibers, and feed position signals back to the actuator drivers to ensure proper positioning of the beams.

17 Claims, 9 Drawing Sheets

U.S. PATENT DOCUMENTS

| | | | |
|---|---|---|---|
| 6,067,859 A * | 5/2000 | Kas et al. | 73/800 |
| 6,137,105 A | 10/2000 | Drobot et al. | |
| 6,394,617 B1 | 5/2002 | Wu | |
| 6,650,801 B1 | 11/2003 | Wu et al. | |
| 6,744,038 B2 | 6/2004 | Wang et al. | |
| 6,778,724 B2 | 8/2004 | Wang et al. | |
| 6,785,437 B2 * | 8/2004 | Hagood et al. | 385/16 |
| 6,806,464 B2 | 10/2004 | Stowers et al. | |
| 6,850,363 B1 | 2/2005 | Michelmann et al. | |
| 6,975,785 B2 | 12/2005 | Ghandi et al. | |
| 7,109,473 B2 * | 9/2006 | Grier et al. | 250/251 |
| 7,315,374 B2 * | 1/2008 | Tan et al. | 356/399 |
| 7,349,085 B1 * | 3/2008 | Tan et al. | 356/364 |
| 2002/0064341 A1 | 5/2002 | Fauver et al. | |
| 2002/0121443 A1 | 9/2002 | O'Connell | |
| 2004/0248167 A1 | 12/2004 | Quake et al. | |
| 2005/0157291 A1 | 7/2005 | Bustamante et al. | |

OTHER PUBLICATIONS

Grange, Wilfried et al., "Optical Tweezers System Measuring the Change in Light Momentum Flux", Rev. Sci. Instrum., vol. 73, No. 6, pp. 2308-2316, Jun. 2002.

Allersma, Miriam W. et al., "Two-Dimensional Tracking of ncd Motility by Back Focal Plane Interferometry", Biophysical Journal, vol. 74, Feb. 1998, pp. 1074-1085.

Massari, Nicola et al., "High Speed Digital CMOS 2D Optical Position Sensitive Detector", European Solid State Circuit Conference (ESSCIRC) in 2002, pp. 723-726.

Svoboda et al., "Biological Applications of Optical Forces," Annu. Rev. Biophys. Biomol. Struct., 1994, pp. 23:247-85.

Hamamatsu Profile Sensor S9132 Preliminary Data Sheet, Jan. 2004, 1 page.

Universitat Leipzip, "Optical Forces", Physik Weicher Materie, 6 pages, Aug. 26, 2003.

Smith, Steven B. et al., "Optical-Trap Force Transducer That Operates by Direct Measurement of Light Momentum", Methods in Enzymology, vol. 361, Elsevier Science, 2003, pp. 134-162.

Smith, Steven B. et al., "Overstretching B-DNA: The Elastic Response of Individual Double-Stranded and SingleStranded DNA Molecules", Science, vol. 271, pp. 795-798, Feb. 9, 1996.

Kellermayer, Miklos S., et al., "Folding-Unfolding Transitions in Single Titin Molecules Characterized With Laser Tweezers", Science, vol. 276, May 16, 1997, pp. 1112-1116.

Buican, T.N., "Automated Cell Separation Techniques Based on Optical Trapping", Cell Separation Science and Technology, Ch. 4, American Chemical Society, 1991, pp. 59-72.

Ghislain, Lucien P., et al., "Measurement of Small Forces Using an Optical Trap", Rev. Sci. Instrum., 65 (9), Sep. 1994, pp. 2762-2768.

Bryant, Zev et al., "Structural Transitions and Elasticity From Torque Measurements on DNA", Nature, vol. 424, Jul. 17, 2003, pp. 338-341.

Bustamante, Carlos, et al., Ten Years of Tension: Single-Molecule DNA Mechanics, Nature, vol. 421, Jan. 23, 2004, pp. 423-427.

Vossen, Dirk et al., "Optical Tweezers and Confocal Microscopy for Simultaneous Three-Dimensional Manipulation and Imaging in Concentrated Colloidal Dispersions", Review of Scientific Instruments, vol. 75, No. 9, Sep. 14, 2004, pp. 2960-2970.

* cited by examiner

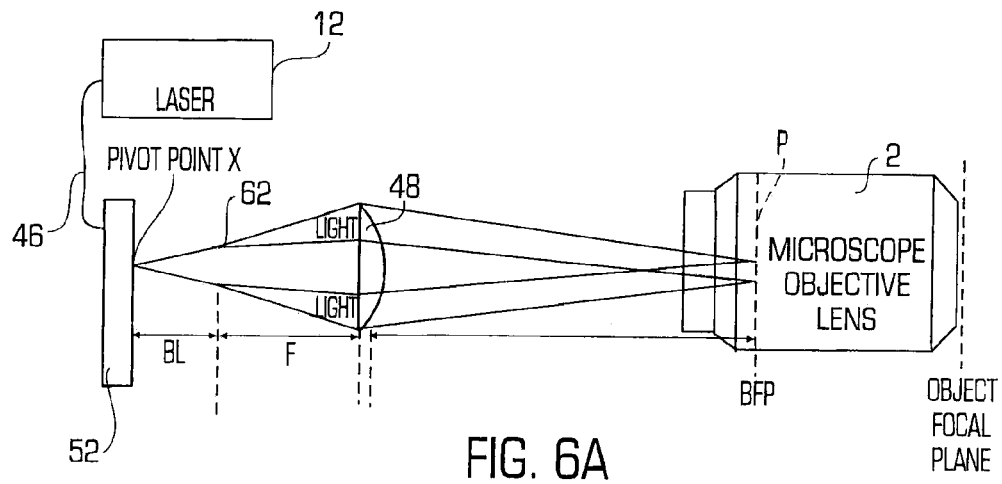
FIG. 6A
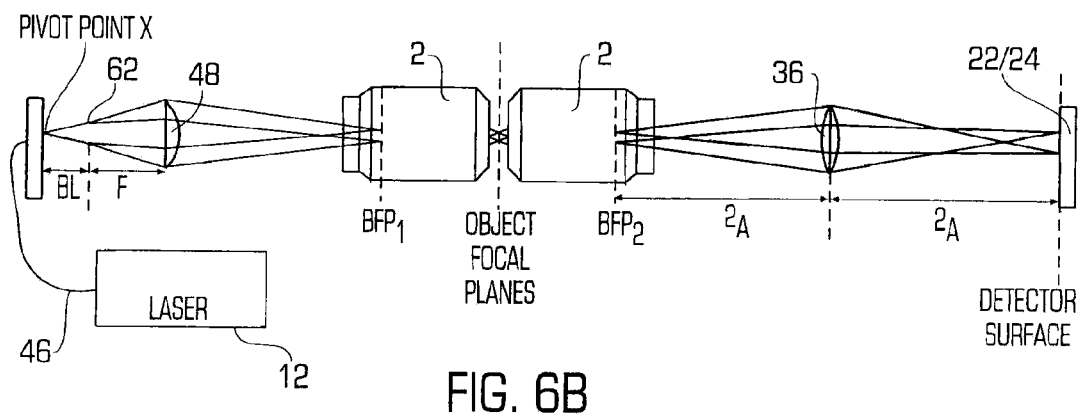
FIG. 6B
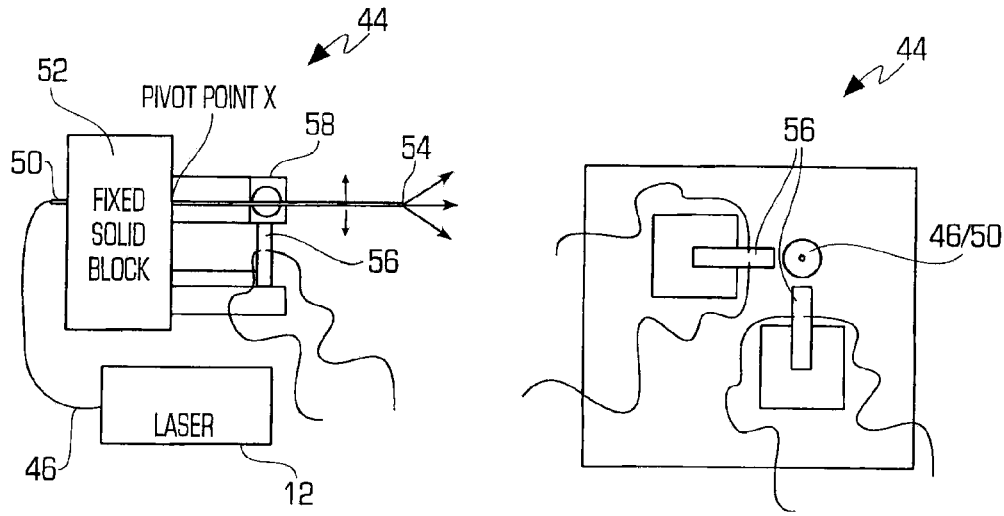
FIG. 7A
FIG. 7B

OPTICAL TRAP UTILIZING A REFLECTING MIRROR FOR ALIGNMENT

This application is a Continuation-In-Part of U.S. application Ser. No. 10/943,709, filed on Sep. 17, 2004 now U.S. Pat. No. 7,274,451, which claims the benefit of U.S. Provisional Application No. 60/504,067, filed Sep. 19, 2003.

GOVERNMENT GRANT

This invention was made with Government support under grant (Contract) No. GM-32543 awarded by the NIH and grant nos.: MBC-9118482 and DBI-9732140 awarded by the NSF. The Government has certain rights to this invention.

FIELD OF THE INVENTION

The present invention relates to optical particle trapping, and more particularly to a device and method for trapping and manipulating tiny objects using laser light, and measuring minute forces imparted on these objects both in transverse and longitudinal directions, as well as alignment techniques for the same.

BACKGROUND OF THE INVENTION

Devices for optically trapping small particles are better known as "optical traps" or "optical tweezers". The technique relies on the forces created by one or more laser beams that are refracted by a microscopic object in order to trap, levitate and move that object. By focusing a laser beam though a microscope objective lens down to a very small spot (focal region), particles with high indices of refraction, such as glass, plastic, or oil droplets, are attracted to the intense regions of the beam and can be permanently trapped at the beam's focal region. Biologists are considerably interested in optical traps because minute forces can be measured with sub-picoNewton accuracy on the trapped object. Since such small forces are not accessible by conventional techniques such as scanning-force-microscopy, optical traps have become a major investigation tool in biology.

One (preferred) method to measure such forces includes capturing and analyzing the light after interacting with the particle and computing the change in momentum flux of the light due to interaction with the particle. Capturing all the light exiting the optical trap can be difficult, given that a single-beam trap needs highly marginal rays in order to trap efficiently, but even a high numerical-aperture (NA) lens may not accept all these rays when they have interacted with the particle and are deflected farther off the optic axis. In such a case, it can be difficult to capture and analyze all the light leaving the optical trap. Therefore, to address this issue, dual beam optical traps have been developed. Conventional counter-propagating beam optical traps have been used to trap particles, and measure extremely small transverse forces imparted on those particles. See for example, "Optical tweezers system measuring the change in light momentum flux", Rev. Sci. Instrum., Vol. 73, No. 6, June 2002. Dual-beam traps are also better than single-beam traps for trapping particles with higher refractive indices.

One drawback to conventional momentum-sensing optical traps, and in particular dual beam counter-propagating optical traps, is that they only detect and measure transverse forces on the particle (x and y directions). Conventional optical traps do not detect and measure axial forces on the particle (z direction). Additionally, counter-propagating optical traps can be difficult to align, that is, to bring the two beam foci together at a common point.

Another issue with optical traps is the alignment of the single or counter-propagating beams, so that the focal region (s) of the lens(es) are properly aligned with the sample (and each other for dual beam devices). For optical tweezers, two different methods are commonly used to move a laser-beam focus relative to samples in the objective focal plane: (1) move the sample chamber relative to the fixed beam-focus until the particle comes to the beam and is captured, or (2) translate the beam focus relative to the fixed sample chamber by changing the entrance angle of the laser beam into the back of the objective lens. The 2nd method has advantage of faster response time, as required for constant-position feedback that cancels Brownian motion in the trap. Beam-steering can be accomplished by several different methods, such as moving the lens, using a galvanometer to move a steering mirror, using an optic modulator to move the beam, translating the end of an optical fiber, etc. See for example, Svoboda and Block, Annu. Rev. Biophys. Biomol. Struct. v.23, pp. 247-285, FIG. 2 (1994).

Each of the conventional beam alignment techniques has its drawbacks. Moving the sample or lens is too slow to cancel Brownian motion. The galvanometer-mirror method is too large and complex. The acousto-optic modulator method is too large and complex, and has low light-transmission efficiency. Translating the delivery end of an optical fiber has potential advantage of simplicity, speed and high light efficiency, but suffers from an effect where the steered beam does not remain fixed at the back-focal-plane (BFP) of the objective lens. A beam steering method that does pivot about the BFP is described by Allersma et al. Biophys. J. v.74, pp. 1074-1085, FIG. 1B (1998). Unfortunately, that system uses the moving-lens "telescope" method, so the frequency response is lower than that required for Brownian-force noise cancellation.

There is a need for an optical trap system and method, as well as alignment system and method therefore, that measures all three components of external forces, and that ensures and maintains the optical alignment of a light beam incident on an optical element such as focusing lens, while changing the incident angle of the light beam on that lens.

SUMMARY OF THE INVENTION

The aforementioned problems and needs are addressed by an optical trap device for trapping a particle, which includes at least one laser light source for generating first and second light beams, first and second lenses for focusing the first and second light beams respectively to a trap region in a counter-propagating manner for trapping the particle in the trap region, a first detector for measuring changes in a power deflection and in a power concentration of the first light beam leaving the trap region, a second detector for measuring changes in a power deflection and in a power concentration of the second light beam leaving the trap region, a light source for illuminating the trap region with a third beam of light, and a camera positioned for capturing a portion of each of the first, second and third light beams.

The aforementioned problems and needs are also addressed by an alignment device that includes a support member, an optical fiber having a generally rigid portion extending from the support member and terminating in a delivery end for emitting a beam of light, a lens for collimating the emitted beam of light, and at least one actuator for exerting a force on the generally rigid portion such that the generally rigid portion pivots about a pivot point of the optical fiber at the support member.

The aforementioned problems and needs are further addressed by an optical trap device for trapping a particle that includes at least one laser light source for generating first and second light beams, first and second lenses for focusing the first and second light beams respectively to a trap region in a counter-propagating manner for trapping the particle in the trap region, a first detector for measuring changes in a power deflection and in a power concentration of the first light beam leaving the trap region, a second detector for measuring changes in a power deflection and in a power concentration of the second light beam leaving the trap region, a support member, an optical fiber having an input end for receiving the first light beam and an output end having a generally rigid portion extending from the first support member for emitting the first light beam toward the trap region, at least one actuator for exerting a force on the generally rigid portion such that the generally rigid portion pivots about a pivot point of the optical fiber at the support member, a beam splitting optical element for reflecting a portion of the first light beam emitted by the optical fiber to a position sensitive detector, wherein the position sensitive detector measures a position of the emitted first light beam and generates a position signal in response to the measured position, and an actuator driver that provides a drive signal to the at least one actuator for exerting the force, wherein the actuator driver receives the position signal and adjusts the drive signal in response to the received position signal.

Other objects and features of the present invention will become apparent by a review of the specification, claims and appended figures.

BRIEF DESCRIPTION OF THE DRAWINGS

FIG. 6A is a diagram illustrating the technique for aligning the optical trap by deflecting the optical fiber that delivers the laser beam to the optical trap.

FIG. 6B is a diagram illustrating how the detector surface is disposed at a conjugate to the pivot point of the optical fiber.

FIG. 7A is a side view of the deflecting optical fiber beam alignment technique using piezo actuators to align the laser beams in the optical trap.

FIG. 7B is an end view of the deflecting optical fiber beam alignment technique using piezo actuators to align the laser beams in the optical trap.

DETAILED DESCRIPTION OF THE PREFERRED EMBODIMENTS

Described below is a method and system for measuring the light force on a trapped object by detecting the change in light's momentum when it interacts with the object, and a method and system for aligning an optical beam in the context of optical traps.

Optical Traps

Figure 1:
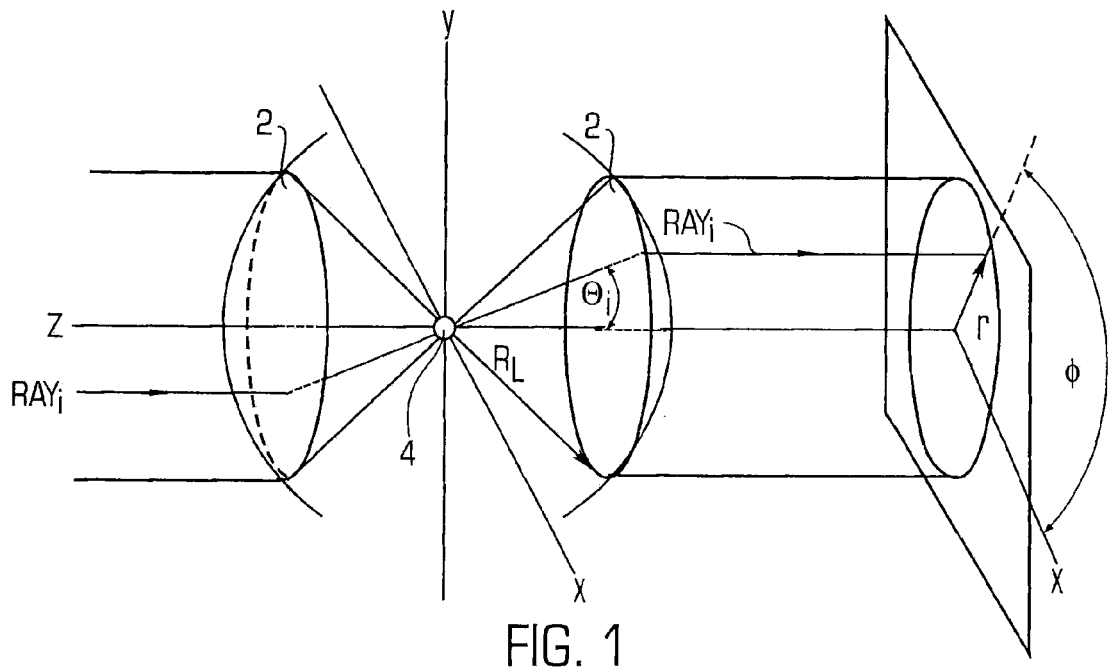
FIG. 1 is a diagram illustrating a particle trapped in an optical trap.

A ray of light can be thought of as a directed stream of photons, which carries with it a momentum flux $dP/dt=nW/c$, where W is the power (Watts) carried by the ray, c is the speed of light and n is the refractive index of the surrounding buffer. In an optical trap containing a pair of objective lenses 2 and a particle 4 held therebetween in a trap region defined by the focal regions of the lenses, a particular ray[i] may be deflected by interaction with the particle 4 through angles $\theta_i$, $\phi_i$ relative to the optic axis of the trap, as shown in FIG. 1. The reaction force felt by the trapped particle due to that ray is given by:

$$F_i = dP_i/dt = (nW_i/c)[i \sin\theta_i \cos\phi_i + j \sin\theta_i \sin\phi_i + k(1-\cos\theta_i)] \quad (1)$$

To compute forces on a trapped particle with many rays passing nearby, it is sufficient to analyze the power of all rays entering and leaving the vicinity of the trap and sum over them according to Eqn. 1, with the sign convention such that an un-deflected ray cancels its flux contribution when it exits. Experimentally, such analysis can be performed by collecting the exiting rays with another lens opposite the trapping lens. If that collection lens is a coma-free objective lens (similar to the trap lens), and if it is placed so the trap focus is also the focus of the collection lens, then a particular version of the Abbe sine condition holds for rays that strike the collection lens. According to this rule, a ray coming from the focus and inclined at an angle $\theta_i$ to the optic axis will emanate from the back principal plane parallel to the optic axis at a radial distance r from that axis given by $$r_i = n \sin\theta_i R_L \quad (2)$$

where $R_L$ is the focal length of the collection lens. Combining Eqns. (1) and (2) in x-y coordinates ($x = r\cos\phi$ and $y = r\sin\phi$) and summing over all rays gives an expression for the force on the particle in terms of the spatial intensity distributions $W(x,y)_{enter}$ and $W(x,y)_{exit}$ of light entering and exiting the lenses.

$$F_x = (1/R_L c)([\Sigma W_i x_i]_{enter} - [\Sigma W_i x_i]_{exit}) \quad (3a)$$

$$F_y = (1/R_L c)([\Sigma W_i y_i]_{enter} - [\Sigma W_i y_i]_{exit}) \quad (3b)$$

$$F_z = (n/c)\{[\Sigma W_i \mathrm{sqrt}(1-(r_i/nR_L)^2)]_{enter} - [\Sigma W_i \mathrm{sqrt}(1-(r_i/nR_L)^2)]_{exit}\} \quad (3c)$$

Figure 2:
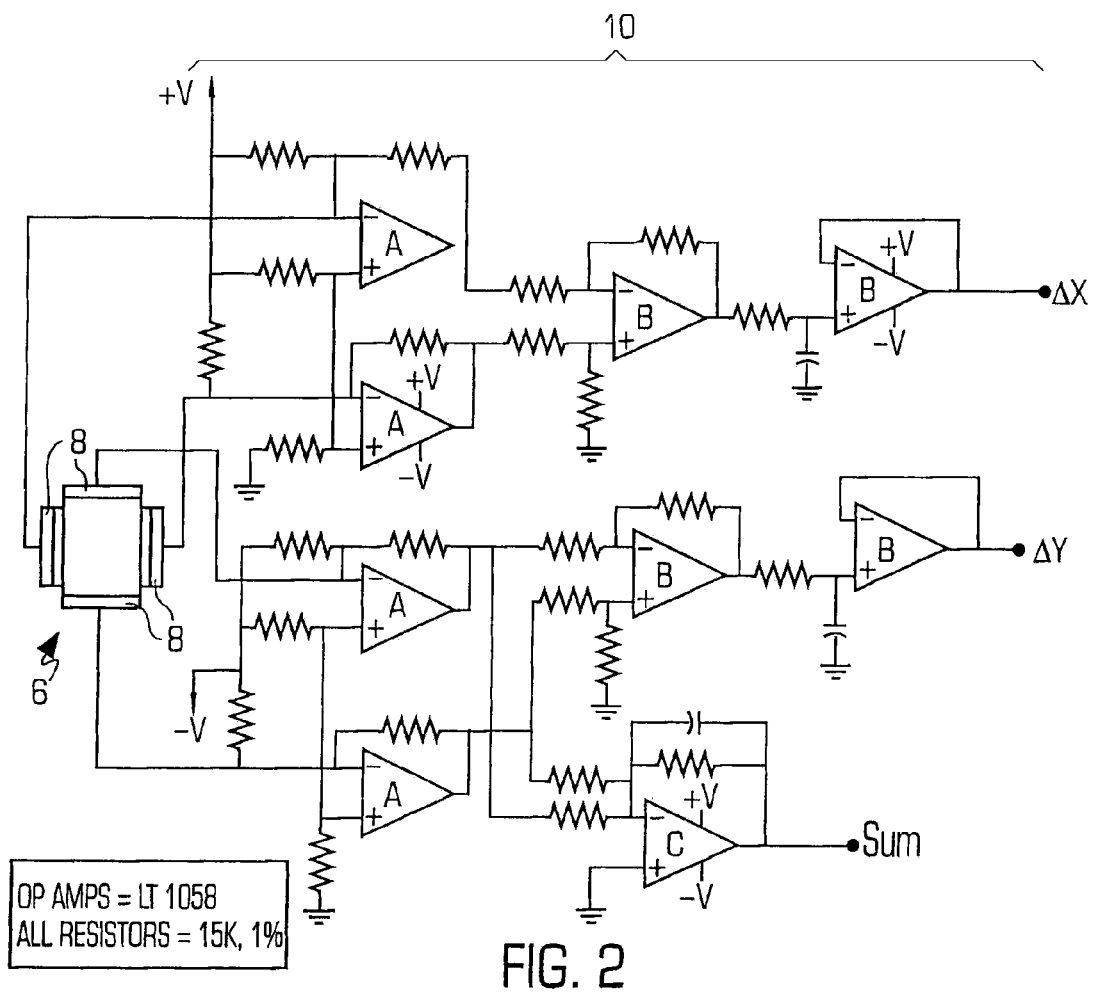
FIG. 2 is a schematic diagram illustrating the position sensor and circuitry for analyzing the light exiting the optical trap.

The distance-weighted sums of the light intensity, $\Sigma W_i x_i$ and $\Sigma W_i y_i$, are called the "power deflections". These moments of the spatial intensity distribution can be measured by projecting the light exiting from the collection lens onto a position-sensitive photo-detector (PSD), also known as a power deflection detector. Such detectors are different from quadrant detectors since they comprise one continuous diode (i.e. a power deflection sensor/detector) 6, not four. They can be thought of as a planar PIN junction photodiode sandwiched between two plate resistors, as shown in FIG. 2. When a light ray strikes a particular point on the detector 6, it liberates holes and electrons in the reverse-biased diode layer that electrically connects the two planar resistors at that point. For each axis (x,y), the resulting current (which is proportional to ray power $W_i$) is divided between the two electrodes 8 at opposite edges of a resistor layer depending on the distances to each electrode from where the ray strikes. The currents from all rays striking the PSD are thus weighted by distance from the edges and summed in a linear fashion. An op-amp circuit 10 such as the one illustrated in FIG. 2 takes the 4 current signals (two into the top PSD layer and two out of the bottom) and converts them into separate signals for x- and y-distance-averaged intensities. Thus, power deflection is a measure of the powers and off-axis distances of all the light rays forming the light beam. Power deflection of the light beam increases if the overall light beam power uniformly increases and/or if the overall light beam shifts position in the positive direction, and vice versa.

The signals from a PSD amplifier (FIG. 2) are given by $$X = \Psi \Sigma W_i x_i / R_D \quad (4a)$$

$$Y = \Psi \Sigma W_i y_i / R_D \quad (4b)$$

where $\Psi$ is the power responsivity of the PSD photo-diode, $R_D$ is the half-width of the square PSD detector area, $x_i$ and $y_i$ are the x and y components of the ray positions, and $W_i$ is the power of each of those rays.

The x and y components of transverse force are given by combining Eqns. 3 and 4:

$$F_x = \Delta X R_D / c \Psi R_L \quad (5a)$$

$$F_y = \Delta Y R_D / c \Psi R_L \quad (5b)$$

where $\Delta X$ and $\Delta Y$ represent changes in the signals from the power deflection detector induced by the X and Y components of the force applied to the particle.

The signals from a PSD detector can be used directly as the x and y force components on a trapped particle, provided the input light momentum is first nulled. That is, the PSD is pre-positioned, with no object in the trap, such that the X and Y outputs are zero. For a symmetrical input beam, this act puts the detector on the optic axis. For an asymmetrical input beam, nulling the detector shifts the zero-angle reference such that the incoming light flux has zero transverse (x,y) momentum in that frame. When a particle is trapped, only the output distribution changes, not the input. Even then, the output distribution remains symmetrical (null outputs) until external forces $F_x$ and $F_y$ are applied to the trapped particle.

A problem for the light-force sensor derives from the necessity to collect all the exiting light to calculate the force. A single-beam optical trap can apply strong radial (x,y) trapping forces, but rather weak axial (z) forces. Unless the beam is highly convergent and includes the full set of marginal rays from a high NA objective lens, the particle may escape out the back (exit) side of a trap due to a reflection or light scattering forces on the particle. Thus, to recover all the exiting light, such a high NA trap requires a high NA collection lens. However, if an external force acts on the particle, then the output rays from the trap will be deflected even farther off axis than the input rays. For larger particle displacements, even the highest NA objectives available may not collect those exiting marginal rays. Therefore, it is preferable (but not necessary) to utilize the light-momentum method using a dual beam optical trap, instead of a single beam optical trap, as detailed below.

It is possible, however, to trap particles with lower NA optics by using counter-propagating laser beams that converge through opposing lenses to a common focus (i.e. common focal region). Thus the reflected or scattering light force is balanced and the axial escape route is blocked. Such an instrument, a dual counter-propagating beam optical trap, has been reduced to practice and is shown schematically in FIG. 3. Vertically polarized light beams from separate diode lasers 12 (e.g. 835 nm light, at 200 mW, from SDL 5431 lasers) are sent through polarizing beam splitters 18, quarter wave plates 16, and objective lenses 2 (e.g. Nikon 60X plan-Apo-water NA 1.2), so that the light beams are circularly polarized as they encounter particle 4. The exiting light beams are collected by opposite objective lenses 2, become horizontally polarized at the opposite quarter wave plates 16, are deflected down by polarizing beam splitters 18, and are split into a pair of beams (preferably equally) by non-polarizing beam splitters 20. The first of the pair of beams are directed to power deflection detectors 22 (which measure transverse momentum of the beams) and the second of the pair of beams are directed to power concentration detectors 24 (which measure longitudinal momentum of the beams). The particle is preferably contained in a fluid chamber 26 formed by two coverslips separated by heat-sealed parafilm strips.

The high NA objective lenses 2 have the ability to focus/collect high-angle rays, but the laser beams which enter them are kept small in diameter, thus under-filling the back apertures. Therefore the trapping rays form a narrow cone (low NA beam) and the most marginal of these rays can be collected by the opposite lens 2, even when those rays are deflected outside the initial set of low inclination angles by the application of an external force to the particle 4. In this instrument, the transverse forces from the two beams add together, and hence the signals from power deflection detectors 22 must be summed to give the x and y components of transverse force on the trapped particle:

$$F_x = (\Delta X_1 + \Delta X_2) R_D / c \Psi R_L \quad (6a)$$

$$F_y = (\Delta Y_1 + \Delta Y_2) R_D / c \Psi R_L \quad (6b)$$

where $\Delta X_1$ and $\Delta X_2$ represent changes in the signals from the first and second detectors respectively induced by the X component of the force applied to the particle, and $\Delta Y_1$ and $\Delta Y_2$ represent changes in the signals from the first and second detectors respectively induced by the Y component of the force applied to the particle.

Figure 4:
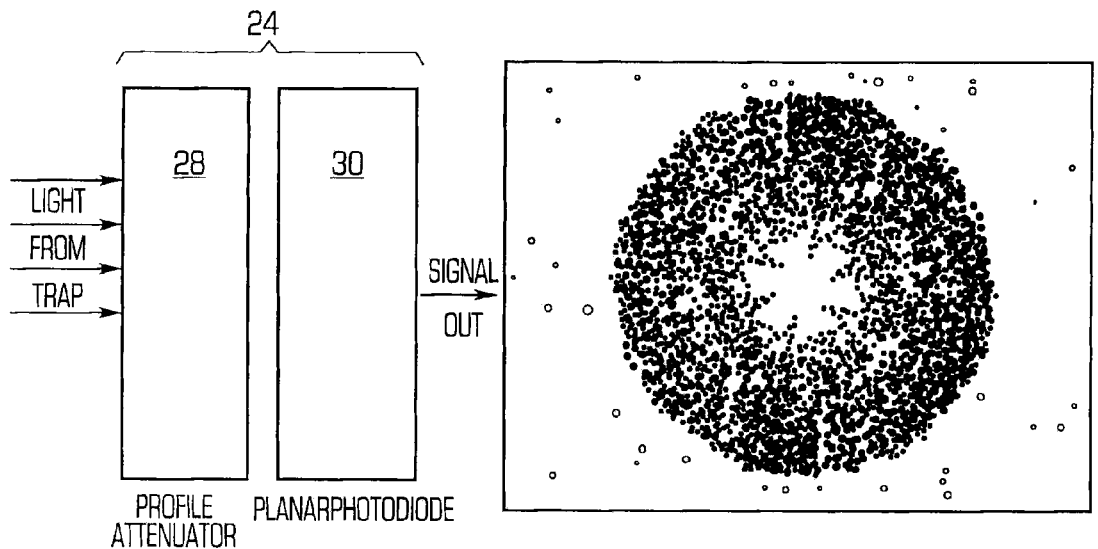
FIG. 4 is a diagram illustrating the profile detector.

To obtain the longitudinal force along the optic axis, $F_z$, a different type of detector is utilized, namely one that measures the power concentration of the incident beam. The power concentration is a measure of cross-sectional distribution of the power within the beam. As the power of the light beam is concentrated more toward the center of the beam, its power concentration is greater. Conversely, as the beam power distribution is more spread out away from the center of the beam, its power concentration is less. Thus, for example, a power concentration detector produces a signal that increases or decreases as the power distribution within the beam becomes more concentrated toward the center of the beam, and vice versa. One example of a power concentration detector is one in which the distance-weight (sensitivity) falls off from the optic axis according to Eq. 3c, for example as sqrt $(1-(r/nR_L)^2)$. Such response is obtained by a power concentration detector 24 having an attenuator 28 with a circular transmission profile, placed over a planar photodiode 30, as illustrated in FIG. 4. The circular transmission profile T is sqrt $(1-(r/nR_L)^2)$, where r is now the radial distance from the center of the attenuator. One such profile generated numerically as pixels is illustrated in FIG. 4.

If the attenuator 28 is constructed so its pattern radius is $nR_L$, then the detector response to light ray$_i$ of intensity $W_i$ that falls a distance $r_i$ from the pattern center will be $$Z = \Psi \Sigma W_i \sqrt{1-(r_i/nR_L)^2} \quad (7)$$

where $\Psi$ is the responsivity of the planar photo-diode. By combining equations (3c) and (7), the force signal $F_z$ is proportional (by a known factor) to the difference between the signals from the two opposing axial power concentration photo-detector signals, namely, $$F_z = (n/c)(\Delta Z_1 - \Delta Z_2)/\Psi. \quad (8)$$

where $\Delta Z_1$ and $\Delta Z_2$ represent the changes in the signals from the two power concentration detectors resulting from longitudinal force on the trapped particle.

In practice, to compensate for differences in laser powers and sensitivities of the axial detector, the difference signal $(\Delta Z_1 - \Delta Z_2)$ is preferably nulled, by addition of an arbitrary offset, before any particle enters the trap. The signals from detectors 22/24 are preferably sent to a processor 14, which calculates particle forces and displacements utilizing the above described equations. Processor 14 could be a stand alone device, or a personal computer running appropriate software.

An advantage of the above described transverse light-force sensor is that calibration depends only on constant factors such as $R_L$ and c that do not change with experimental conditions. Force is obtained from the conservation of linear momentum of light as measured in the far field. Thus the measurement of force becomes independent of trap/bead details such as shape and size of the particle and refractive indices. Unfortunately, for the above described axial force sensor, its calibration changes with the refractive index of the fluid buffer surrounding the particle. For instance, adding 1 molar NaCl to water inside the fluid chamber changes its index from 1.334 to 1.343. Such a –1% correction could simply be applied to the values in Eq. 8, except that the circular-profile attenuator is constructed with a particular radius suitable for water (Eq. 7). For typical rays, where $r/nR_L < 0.5$, the residual z-force error will be very small, i.e. less than ¼ percent.

Figure 5:
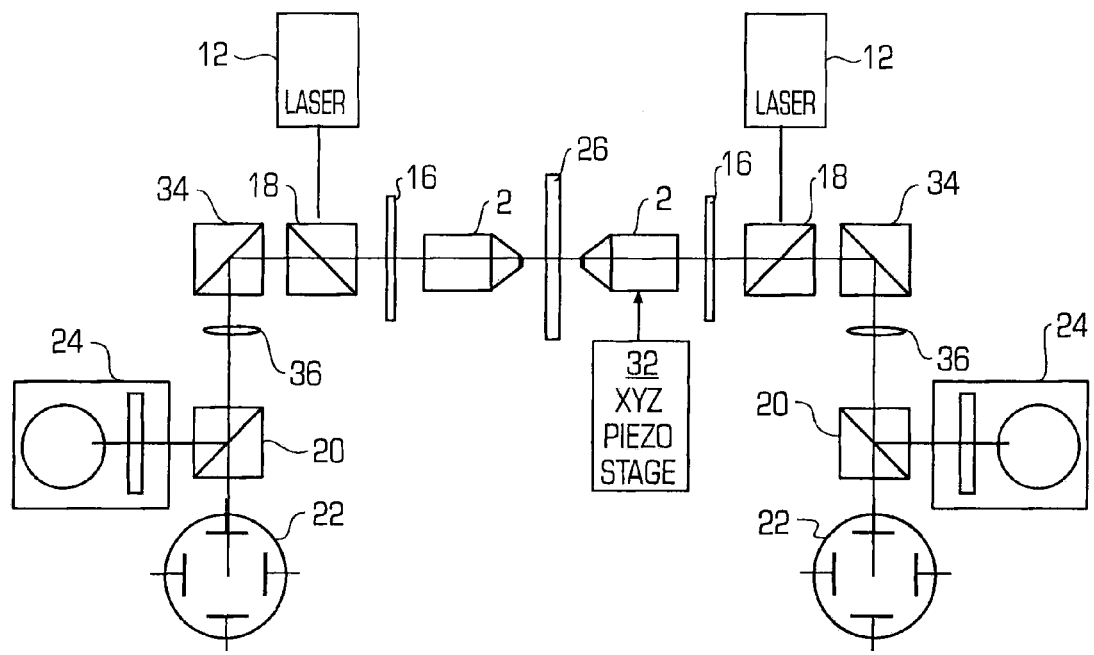
FIG. 5 is a diagram illustrating a first technique for aligning the optical trap.

Due to changes in room temperature or humidity and its effect on many optical parts, an optical trap with dual counter-propagating beams requires constant alignment in order to keep the foci (focal regions) of the counter-propagating beams coincident. Such alignment involves moving one trap focus to lie on top of the other. To move a focus, either the beam angle must be steered as it enters the back of the objective lens, or else the whole objective lens must be moved. FIG. 5 illustrates a solution of the latter type, where optical trap of FIG. 4 is modified so that one of the objective lenses 2 is movable with a piezo-actuated x-y-z stage 32 to overlap the foci. Other modifications include the addition of second polarizing beam splitters 34 and relay lenses 36. If a particle has been trapped, this means the foci of the two counter-propagating beams are close enough to maintain the trap, and there is insufficient external forces on the particle to break the particle free. But if the foci are slightly misaligned, then the trap beams will exert force on each other (trade momentum) via their common interaction with the particle.

While an external transverse force on the trapped particle deflects both exiting beams in the same direction, a transverse misalignment of the foci causes the exit beams to be deflected in opposite directions. In this case, information to correct the alignment error (by moving the objective lens) may be derived from the differential force signals. Whereas the $F_x$ is proportional to the sum of PSD signals $\Delta X_1 + \Delta X_2$, the x-axis alignment error is proportional to their difference, namely $\Delta X_1 - \Delta X_2$. To control transverse alignment, an instrument computer uses a proportional-integrative-differential (PID) feedback algorithm to move the piezo stage based on readings from the transverse force sensors of power deflection detectors 22. Here the x-axis error signal is $\Delta X_1 - \Delta X_2$ and the y-axis error signal is $\Delta Y_1 - \Delta Y_2$.

Foci may also be misaligned along the optic axis, that is, they may form short of each other or past each other along the z-axis. In the former case (falling short), the two beams pull each other forward via their common interaction with the trapped particle, and increase both their forward momenta. Thus both beams get smaller (more concentrated) about the optic axis, increasing their transmission through the patterned attenuators (axial-force sensors). In the latter case (foci formed past each other), the beams retard each other and their exit angles widen, decreasing their transmission through the patterned attenuators. An axial-alignment error signal can be derived from comparison of current axial sensor outputs with a particle in the trap, $(Z_1+Z_2)_{full}$, to that of a previous measurement when the trap was empty, $(Z_1+Z_2)_{empty}$. However the "empty" measurement is not current and would need to change if the laser power changes with time. Therefore it is best to normalize the $\Delta Z$ signals by their respective laser powers, as measured by the power deflection detector "sum" outputs (see FIG. 2). Then, the improved z-axis error signal becomes:

$$z\text{-error} = (Z_1/\text{Sum}_1 + Z_2/\text{Sum}_2)_{full} - (Z_1/\text{Sum}_1 + Z_2/\text{Sum}_2)_{empty}. \quad (9)$$

This axial error signal is processed by the computer's PID algorithm and fed back to the z-axis piezo of the objective XYZ stage 32. Alternately, if an optical fiber is used to deliver the laser beam to the lens 2, the distance between the delivery end of the optical fiber and the lens 2 can be adjusted based on the error signal to align the foci of the two beams. Such a system corrects temperature drift in the axial alignment of the foci.

The above described counter-propagating-beam laser optical trap utilizes specialized photometric sensors placed in (or referenced to) the back focal planes of objective lenses to measure changes in the spatial distribution of light intensity there, changes caused by some action on the trapped particle. The beam trap manipulates micron-sized refracting particles while simultaneously measuring external forces on that particle via changes in the momentum of the trapping light. The above described beam trap can measure pico-Newton external forces of the particle in all three orthogonal axes.

Figure 3:
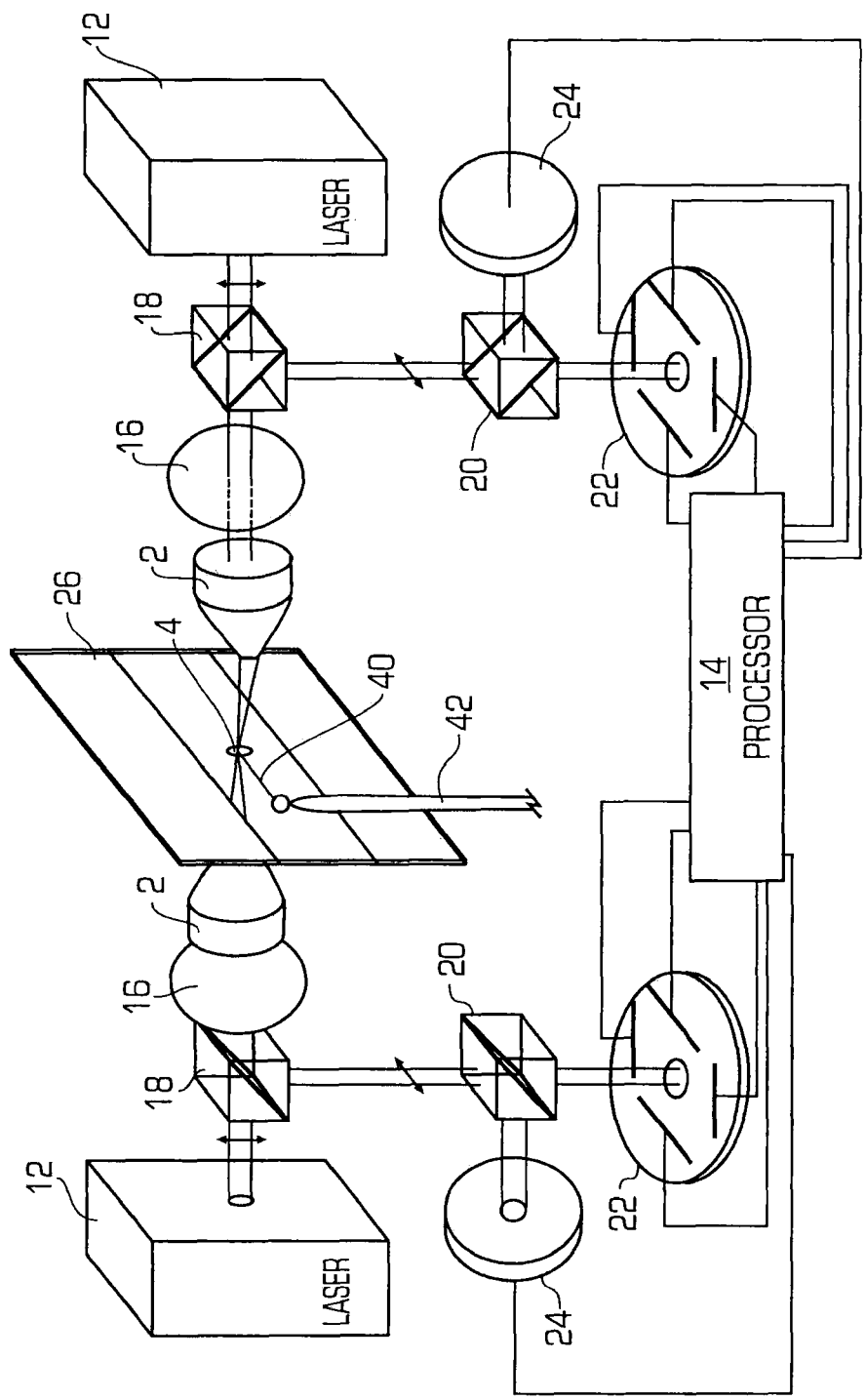
FIG. 3 is a diagram illustrating the counter-propagating beam optical trap.

For example, as illustrated in FIG. 3, a molecule 40 can be attached between particle 4 and a pipette 42, to examine its mechanical properties. As the pipette 42 is moved to exert mechanical stresses on the molecule, the force exerted in the molecule can be measured by the optical trap. All three force components ($F_x$, $F_y$, $F_z$) on the trapped particle, and thus on the molecule attached thereto, can be measured. Calibrations for both transverse and axial measurements are immune to changes in focus sharpness, particle size/shape/index, or laser power, and both can be used for alignment of dual trap beam foci, either against transverse errors or longitudinal errors. Calibration of the transverse force sensor is immune to changes in refractive index of buffer liquid, whereas longitudinal sensor calibration is affected slightly.

Beam Alignment

FIG. 6A illustrates beam alignment via pivoting an optical fiber. Instead of moving one of the beams by moving one of the objective lenses 2, the beam is transversely moved in the trap (or in any other application) by moving the light beam before it reaches the objective lens 2 using an actuator assembly 44 that bends an optical fiber about a pivot point (see FIGS. 7a and 7B). Specifically, the optical output of the laser diode 12 is coupled into a low-mass optical fiber 46, which has a generally rigid portion that is moved (driven) with actuators (e.g. piezo-electric devices) to achieve a high frequency response (>2 kHz). The delivery end 62 of the optical fiber 46 is positioned one focal-length (F) away from a positive lens 48 so as to produce collimated light which enters the back of an infinity-corrected microscope objective lens 2. The optical fiber 46 is held at a pivot point X (farther from the lens) by a plate, block or other rigid member 52, such that the optical fiber pivots about that point (with a bend length BL) when the actuators move.

Pivot-point X is a conjugate focal point (through the positive lens 48) to a point at the center of the objective lens' back focal plane (BFP), which is a plane perpendicular to the optic axis at back focus of the lens. Pivoting the optical fiber in this manner actually tilts the optical fiber delivery end 62 away from the center of lenses 2 and 48. Yet, this movement causes the angle of light entering the objective lens 2 to change (thus steering the trap focus transversely) while the beam remains stationary at the BFP of the objective lens 2 (i.e. the beam rotates about the BFP of lens 2). Thus, the light beam pivots about an optical pivot point P (at the BFP) as the optical fiber pivots about it mechanical pivot point X. The advantage of this configuration is that it provides a faster response time in translating the beam on the far side of lens 2, as required for constant-position feedback that cancels Brownian motion in the optical trap.

Calibration stability for the optical trap derives from accurate measurement of light-momentum flux irrespective of changes in particle size, refractive index or trap position. The relay lenses 36 are used to make the calibration particularly immune to changes in trap position. The expression in Equations 3(a-c) are accurate provided that the rays in FIG. 1 between the right-hand lens 2 and the detector surface are collimated and on-axis. In practice, however, rays coming out of a lens are seldom perfectly collimated or centered. Indeed for a steered trap shown in FIG. 6A, the rays entering and leaving the lenses are deliberately made off-axis. The problem of transferring the luminance pattern (intensity distribution) from the lens 2 to the detectors 22/24 would be exacerbated by a large distance between the lens and detectors because the pattern wanders further off axis with distance or grows larger/smaller depending on collimation errors. The ideal place to put the detector to eliminate such effects is at the Back-Focal Plane (BFP) of the lens 2. At that location, changes in trap position relative to the optic axis will not affect the rendering of angle distributions Eq. 1 into spatial distributions on the detectors (Equations 3). Unfortunately the BFP is generally located somewhere inside of a typical microscope objective lens. To effectively place the detectors 22/24 inside such a lens, a relay lens 36 is used to project the BFP onto the surface of the detectors. That is, the detector surfaces of detectors 22/24 are disposed at a conjugate focal plane to the BFP of the objective lens 2 through a separate relay lens 36.

A particular example of a conjugate-plane arrangement that gives null sensitivity to trap movement is illustrated in FIG. 6B. Here the fiber's pivot-point X is conjugate to the $BFP_1$ (back focal plane of the first, left-hand, objective lens 2). The light beam from the fiber end does not translate at $BFP_1$, but rather pivots around the optic axis at the $BFP_1$ as the fiber is pivoted. Meanwhile, the optical beam at the optical trap (at the objective lens focus) translates in the object-focal plane in order to manipulate trapped particles. The two objective lenses 2 are placed so their object focal planes OFP's are coincident. Therefore, the $BFP_2$ (back focal plane of the second, right-hand, objective lens 2) becomes conjugate to the $BFP_1$ and also conjugate to pivot-point X. Thus the beam of light does not translate at the $BFP_2$, but instead pivots around the optic axis there. In this example, a relay lens 36 of focal length A is placed half way between the $BFP_2$ and the surface of one of the detectors 22/24. A distance of 2A (double the focal length A) is left on both sides of the relay lens 36 (between $BFP_2$ and the relay lens 36, and between the relay lens 36 and detector 22/24). The $BFP_2$ is therefore imaged onto the detector surface with unity magnification. The detector surface becomes conjugate to $BFP_2$, and thus to $BFP_1$, and thus to pivot-point X. The light beam does not translate at the detector surface when the optical fiber is pivoted and the optical trap is moved. Once the detector 22/24 is centered on the optic axis of the light beam, the force signal remains null regardless of trap movement if nothing is in the trap to deflect the light beam. In practice, the light beam is split (as shown in FIG. 5) so that the surfaces of both detector 22 and detector 24 are conjugate to the pivot-point X.

FIGS. 7A and 7B illustrates an actuator assembly 44. The optical fiber 46 is pivoted by placing its delivery end inside a thin metal tube 50 that is clamped or otherwise fixed by plate or block 52. The optical fiber 46 is preferably cemented to the tube 50 at its distal end so it moves with the tube-end 54. The optical fiber emits light outward from the tube-end 54 (preferably the tube end and fiber distal end are adjacent or even coincident). The portions of tube 50 and optical fiber 46 therein extending from plate/block 52 together form a generally rigid portion of the optical fiber, and plate/block 52 serves as a support member for pivoting this rigid portion. Electrical signals are supplied to piezo stack actuators 56 (such as NEC Corp. AE0203D08), which exert forces on and deflect the tube 50 (and optical fiber 46 therein). Two such actuators 56 preferably act on a hard spherical enlargement 58 ("ball pivot") of the tube 50, and are arranged at right angles so as to give orthogonal bending deflections and thus steer the laser-trap beam focus in both transverse dimensions of the object focal plane. Placing the ball pivot 58 close to the pivot point X and far from the tube's distal end amplifies the movement of the tube end 54. Thus a piezo stack that moves a short distance can cause the optical fiber delivery end to move a large distance. Z-axis adjustment can be implemented by moving the entire piezo actuator assembly 44 (along with lens 2) via a stage or a third piezo actuator.

Figure 8:
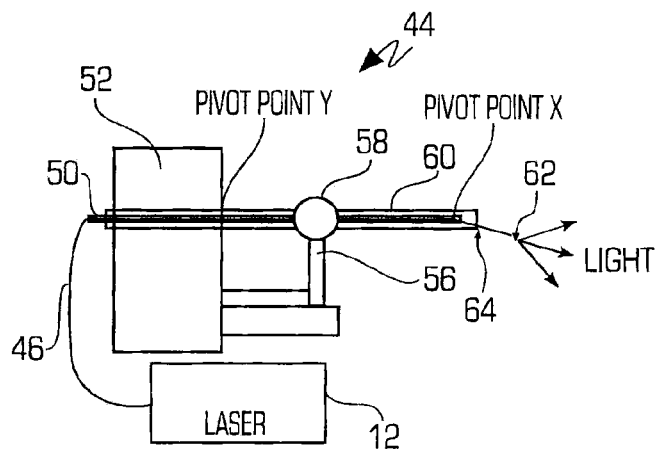
FIG. 8 is a side view of an alternate embodiment of the deflecting optical fiber beam alignment technique.

FIG. 8 illustrates an alternate embodiment of the actuator assembly 44. Depending on the focal length of the collimating lens 48 and the distance to the BFP, pivot point X may need to be rather close (e.g. <1 cm) to the delivery end 62 of the optical fiber 46. Therefore, considering the large size of the actuators 56 and spherical enlargement 58, the actuator assembly 44 can be configured as illustrated in FIG. 8, where the optical fiber 46 pivots nearer its output end 62 (i.e. pivot point X is close to the fiber delivery end). With this configuration, actuators 56 push/pull on and bend an outer tube 60 (which concentrically surrounds tube 50). The outer tube 60 preferably includes a pivot screen 64 disposed at its distal end, which is an electro-formed metal screen having small square holes. The glass optical fiber 46 extends out of tube 50 and passes through one of these holes and rests in the square corner of that hole. Nearby, the optical fiber 46 is clamped or otherwise secured inside tube 50, which does not move. Sufficient clearance exists between tubes 50/60 such that the outer tube 60 can bend from the actuator pressure (i.e. pivot about pivot point Y), while the inner tube 50 remains straight. Thus, in this embodiment, it is the inner tube 50 serves as the support member for the generally rigid portion of the fiber, and the generally rigid portion of the optical fiber is that portion of optical fiber 46 extending out of inner tube 50. This portion of the optical fiber is generally rigid by either sufficient reinforcement (separate tube or plastic sheathing) or small enough in length relative to its inherent stiffness, such that it generally does not bend under the weight of gravity as it pivots. Outer tube 60 is affixed to support member 52 and pivots about pivot point Y, which induces the generally rigid portion of optical fiber 46 to pivot about pivot point X as the optical fiber is deflected by the movement of the pivot screen 64. This configuration has two levels of distance-amplification over the normal actuator movement: one level where the distal end of the outer tube 60 moves farther than the actuators 56, and another level where the output-end 62 of the optical fiber 46 moves farther than the pivot screen 64 (at end of the outer tube 60).

Figure 9:
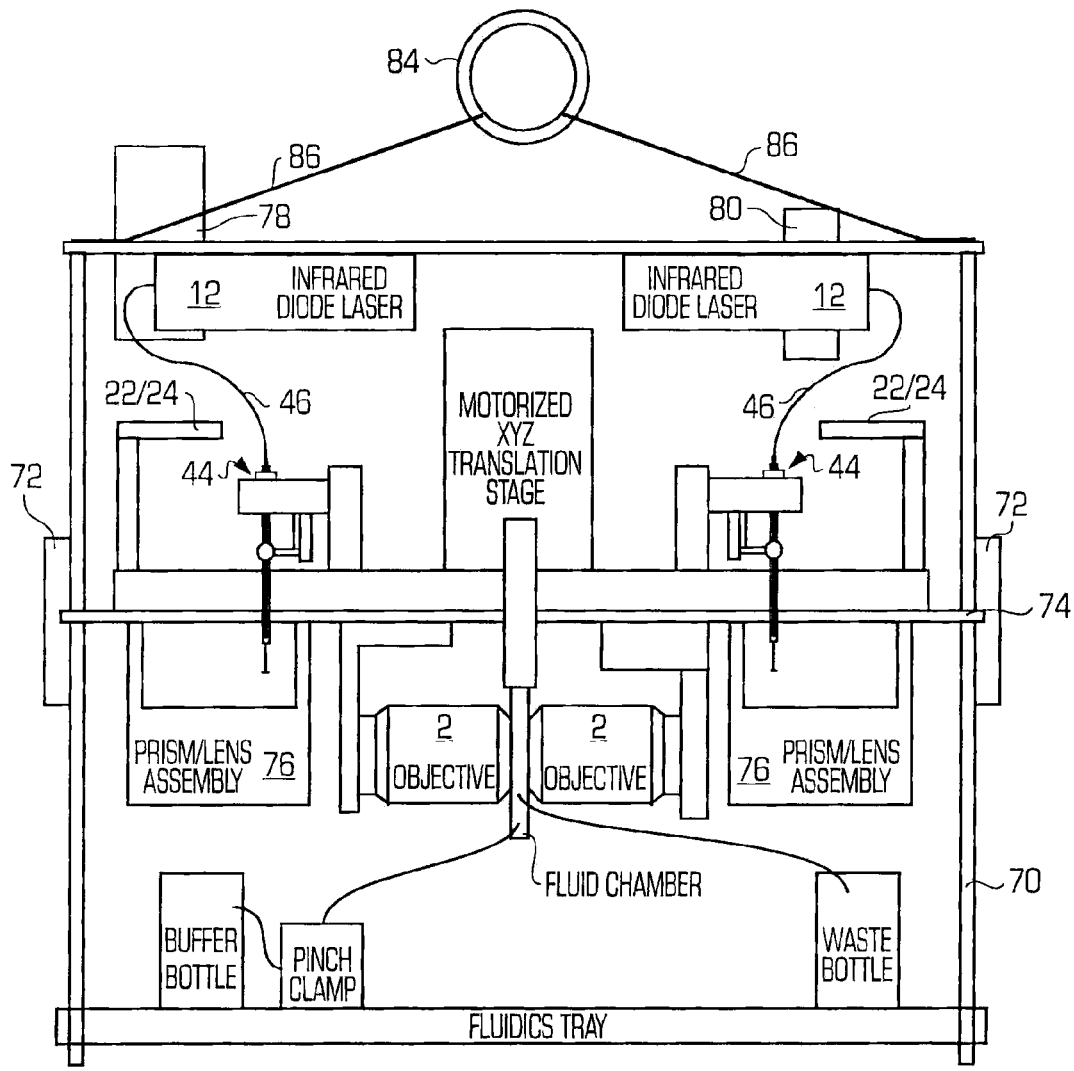
FIG. 9 is a side view of a miniaturized and enclosed version of the counter-propagating beam optical trap.

Additional details regarding the optical beam trap usable in conjunction with the beam alignment device and method will now be discussed. FIG. 9 illustrates an embodiment that allows for more precise force/distance measurements that are not hindered by floor vibration, acoustic noise, and room temperature changes. A large apparatus on an optical table is especially difficult to isolate from vibrations if it sits on a floor that people walk on. Air-leg supports on such tables can transmit and even amplify low-frequency floor vibrations (below 5 Hz). Large metal tables also undergo large dimensional changes when the room temperature changes. A steel table 1-meter wide can expand over 10.000 nanometers for each 1-degree C. rise in room temperature. By reducing the optical trap apparatus in size, it becomes practical to enclose all optical elements in a temperature-controlled metallic shield (to prevent temperature induced dimensional changes, exclude dust particles and block audible room noise). Likewise, it becomes possible to hang the apparatus from the ceiling by an elastic cord or spring and thus better isolate it from building/floor vibrations, down to a lower frequency cutoff than an optical table (<1 Hz).

Thus, the above described counter-propagating-beam laser optical trap can be miniaturized by making five changes: (1) All lens and prism components are reduced to minimum size consistent with laser-beam diameter. (2) All free-air optical paths are reduced to a minimum length. (3) The optical breadboard-table is replaced by a custom-machined optical rail. (4) Many parts in the laser conditioning optics (namely the heating/cooling diode laser mount with collimating lens and Faraday isolator and anamorphic prism and astigmatism correction lens and spatial filter input lens and pinhole filter and spatial filter output lens) are replaced with by single small component, that is, a "butterfly mount" temperature-controlled diode laser coupled to single-mode optical fiber. (5) Finally, the assembled optical components are enclosed in an aluminum housing with attached heaters (thermostatically controlled to maintain constant housing temperature). Two additional improvements can include: placing the objective lenses and fluid chamber level with or below the optical components so that if a fluid leak occurs then the salt-buffers will drip downward away from the optics, and employing the above described object-focal plane, piezo-electric driven optical beam translators for independent translation of the laser-trap foci.

Consistent with the above described miniaturization, optical trap of FIG. 9 includes a housing 70 (preferably made of aluminum), the temperature of which is controlled by one or more thermostatic heaters 72. The optical components are mounted to an optical rail 74, with the objective lenses 2, the prism/lens assemblies 76 (which includes the beam splitters 18, quarter wave plates 16, etc.), the piezo actuator assemblies 44, the detectors 22/24 and the laser diodes 12 mounted even with or above the fluid chamber 26. A CCD camera 78 and visible light source 80 can be included for capturing images of the particles through the optical chain of objective lenses. An attachment ring 84 and cords 86 (e.g. vibration dampening elastic or bungee type chords) are used to suspend the housing 70.

While longitudinal momentum measurements are more conveniently measured using an optical trap with counter-propagating beams as described above and shown in FIGS. 3-5 and 9, it should be noted that it is possible to perform such measurements using an optical trap with a single beam, as now explained below.

An external force on a trapped particle registers as a change in the light momentum entering vs. leaving the trap. Therefore it is important to know both the light intensity distribution going into the trap and coming out, to make a valid force measurement. For transverse forces, this task is simplified by moving the power deflection detectors 22 to a position that is centered on the undeflected beam. This adjustment is made with lasers 12 running but no particle in the trap. More specifically, the power deflection detectors 22 measure only the light exiting the trap, not entering it, so they perform only half of the integration required in Equations 3. This problem is solved by aligning the detectors on the optic axis so that, when no particle is present in the trap, the output beams are centered on the detectors and the difference signals vanish. The light entering the trap carries no transverse momentum in this frame of reference and need not be considered even after a particle has been introduced. Only the exiting light is affected by interaction with the particle.

However there is no way to move a power concentration detector as shown in FIG. 3 so as to null its output when the laser is on and no particle is in the trap. For axial forces, Eq. 3(C) also must be "differenced" in order to give the proper Z-axis force. The signals for each power concentration detector should be performed in 2 steps as follows: measure a signal value $Z_{initial}$ with no particle in the trap, and then measure a signal value $Z_{final}$ with an object in the trap, and take the difference $\Delta Z = Z_{final} - Z_{initial}$. If this $\Delta Z=0$, then no external force is acting on the beam of light detected by that particular PSD. Accordingly, Eq. (7) can be modified to read:

$$Z = \Psi' \{ [\Sigma W_i \text{sqrt}(1-(r_i/nR_L)^2)]_{final} - [\Sigma W_i \text{sqrt}(1-(r_i/nR_L)^2)]_{initial} \} \quad (10)$$

and the corrected form of Eq. 8 for a single-beam trap might seem to be simply $$F_z = (n/c)(\Delta Z)/\Psi'. \quad (11)$$

Unfortunately, a further consideration complicates force measurements in a single-beam trap (or for a dual-beam where the laser powers are different). Most trapped particles, such as plastic or silica beads, are not anti-reflection coated. Therefore a small Fresnel reflection develops at their dielectric/water interface. This reflection of the trapping beam creates a pressure on a trapped particle that moves it forward in the trap (away from the laser source). At some equilibrium position, the forward force is balanced by a refraction force. Here the forward momentum of the transmitted light is increased by concentrating the rays near the optic axis, just enough to balance the momentum kick from the reflected light. Placing a particle in a single-beam trap will cause it to settle slightly forward in the trap and increase $Z_{final}$ over $Z_{initial}$, even though there is no external force on the particle.

There are several possible techniques to deal with this false Z-force component of the detector signal: First, use a dual-beam optical trap with two counter-propagating beams of equal power, so the particle remains in the center of the trap. Second, make differential measurements where $Z_{initial}$ is determined from a trapped particle but it is known that the external force on that particle is zero. Then, apply the external force and measure $Z_{final}$. Such a technique may be inconvenient to use in practice. Third, use a single beam, but use two power deflection detectors 22 and two power concentration detectors 24 in a similar manner as shown in FIG. 3 (i.e. essentially omit one of the lasers 12 from the configuration of this figure). This third technique is now explained in more detail.

The detectors 22/24 of FIG. 3 measure the transmitted light from the opposite-side laser. However, with the arrangement of the quarter-wave plates 16, any reflected light from a particle is collected by the near-side objective lens 2 and directed back into the near-side detectors 22/24. The reflected light is therefore correctly counted as momentum flux to compute force. Thus, by omitting one of the lasers from the configuration of FIG. 3, one set of detectors 22/24 is used to measure the transmitted light and the other set of detectors 22/24 is used to measure the reflected light. To measure Z-force in such a configuration, the $Z_{initial}$ signal is first obtained for both transmitted and reflected light with no particle in the trap. Then, a particle is trapped that is subject to an arbitrary external force, where the $Z_{final}$ signal is measured for both the transmitted and reflected light according to:

$$Z_{transmitted} = Z_{transmitted-final} - Z_{transmitted-initial} \quad (12a)$$

$$Z_{reflected} = Z_{reflected-final} - Z_{reflected-initial} \quad (12b)$$

Thus, the force signal $F_z$ is:

$$F_z = (n/c)(\Delta Z_{transmitted} - \Delta Z_{reflected})/\Psi'. \quad (13)$$

This is physically the same measurement as that of the dual-beam optical trap according to Eq. 8.

Figure 10:
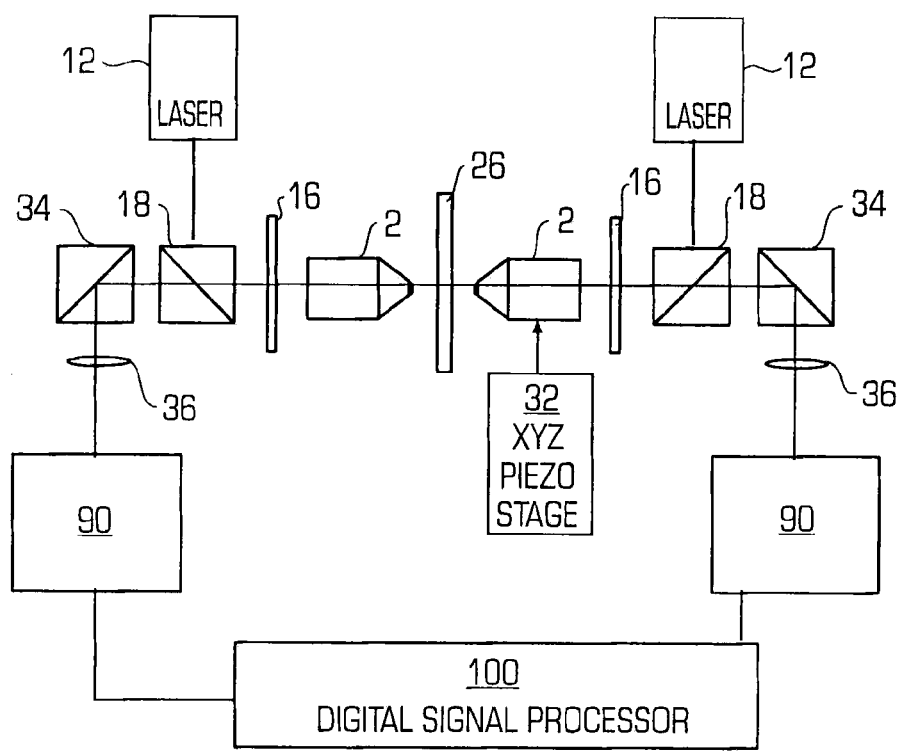
FIG. 10 is a diagram illustrating use of pixel-array detectors and digital signal processor in force-measuring optical trap apparatus.

It should be noted that each set of detectors 22/24 can be combined into a single detector that measures both transverse and longitudinal momentum of the light beam. More specifically, the power deflection detector 22, the power concentration detector 24 and the beam splitter 20 can be replaced with a single detector 90 as shown in FIG. 10. Detector 90 includes a 2-dimensional array of light-sensitive elements (pixels) with an appropriate electronic read-out interface. The pixel intensities could be read into a computer or control circuit where calculation of forces are made numerically by weighting the individual pixel intensities by their distances from the optic axis, and combining them according to Eq. 3. Alternately, the pixel intensities could be processed locally (on the detector chip) to extract moments of the pixel-intensity distribution. In using detector 90, $W_i$ would be the light intensity at a specific pixel, the distance $x_i$ would correspond to the x-coordinate of that pixel (relative to center=0), the distance $y_i$ would be its y-coordinate, and its radius would be given by $r_i = \sqrt{x_i^2 + y_i^2}$. A CCD television camera and frame-grabber would suffice for collecting such data, especially if the frequency response (including exposure, readout and computation time) exceeds 5000 Hz in order to cancel Brownian motion inside the trap. Newly developed high-speed cameras and frame grabbers are now available (see for example EPIX, Inc, http://www.epixcorp.com/products/pixci_cl3sd.htm). The signal processor 100 would then receive digital data from two such camera/frame-grabber combinations. A new class of digital PSD (also called "profile sensor") is available that promises both low cost and high speed in a pixel-array detector. These detectors pre-process the pixel data on the same chip as the pixel array so as to reduce the amount of serial data that needs to be sent to the computer, i.e., the frame-grabber-processor function is "built-in" (see for example, Hamamatsu (Solid State Division) Profile Sensor S9132 Preliminary Data Sheet January, 2004; and "High Speed Digital CMOS 2D Optical Position Sensitive Detector" by Massari et al. at the European Solid State Circuit Conference (ESSCIRC) in 2002, available online at http://www.itc.it/soi_publications/pub/43.pdf).

Figure 11:
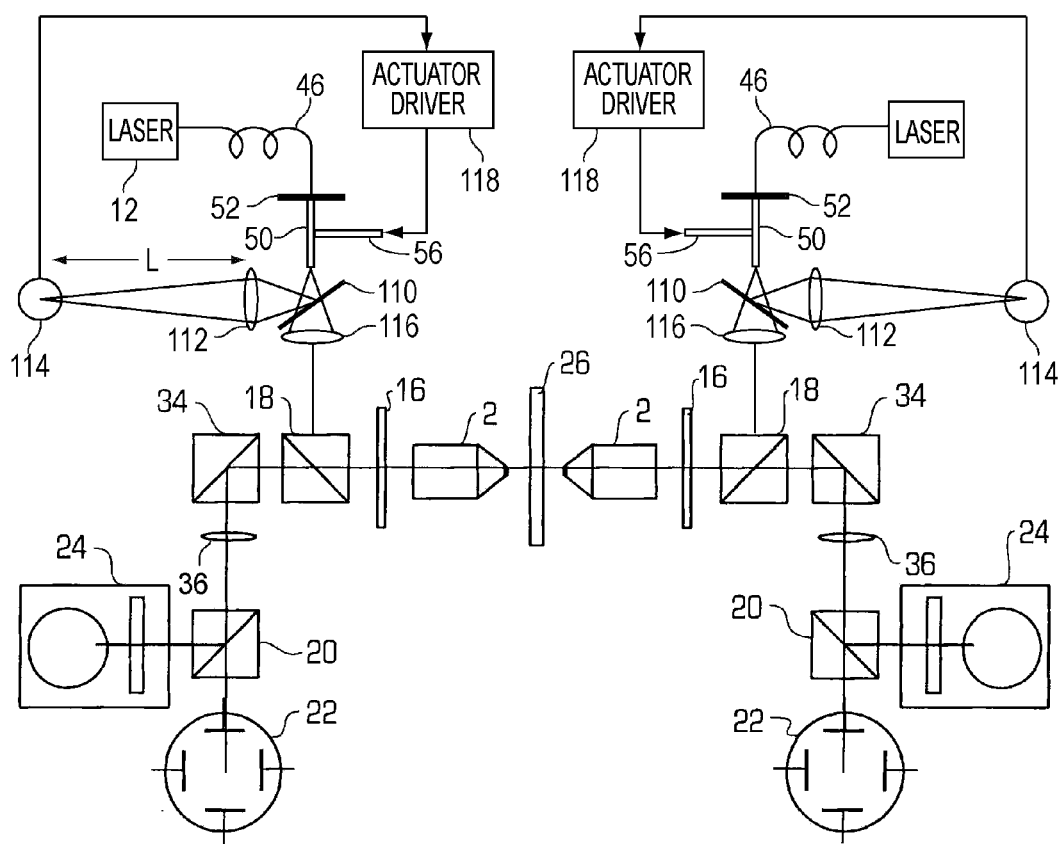
FIG. 11 is a diagram illustrating active feedback for positioning optical fibers that deliver the light in the force-measuring optical trap apparatus.

FIG. 11 illustrates an embodiment that provides active feedback for better beam movement control when using an actuator assembly 44 to implement beam movement to effectuate trap position changes. As described above, the beams can be moved by using actuators 56 (e.g. piezo-electric devices) to move the delivery ends 62 of the optical fibers 46. However, many actuators such as piezo-actuated devices can be non-linear and hysteretic in their response to a change in input voltage. Therefore, this embodiment provides a mechanism to accurately measure the fiber tip position, and to feed that information back into the actuator drivers to more accurately and more rapidly position the fiber tip positions. More specifically, for each laser 12 and optical fiber 46, a beam splitter 110 (e.g. a pellical membrane such as an uncoated nitro-cellulose film inclined at 45 degrees) is used to split off a small portion of the light exiting the optical fiber 46 (e.g. <8%). This light is then focused by a lens 112 down to a spot on a position sensitive detector (PSD) 114 spaced some distance away, thus forming a "light lever" position detector for the fiber tip. Splitting the light adjacent the fiber end allows for the placement of the lens 112 as close as possible to the fiber, and avoids distorting the spherical wave front emanating from the fiber tip. The light passing through the beam splitter 110 is focused into the optical trap using a second lens 116.

The lens 112 has a relatively short focal length F (e.g. around 1 centimeter) and is spaced from the PSD 114 by a distance L (e.g. approximately 25 cm). Movement of the light spot on the PSD 114 correlates with movement of the fiber tip, but is amplified by a factor of L/F. The signal from the PSD 114 is fed to the actuator driver 118 that drives the actuator 56. The actuator driver 118 uses the signal from the PSD 114 to make any necessary adjustment to the output voltage sent to the actuator 56 to achieve the precise desired fiber tip position at any given instant.

Figure 12:
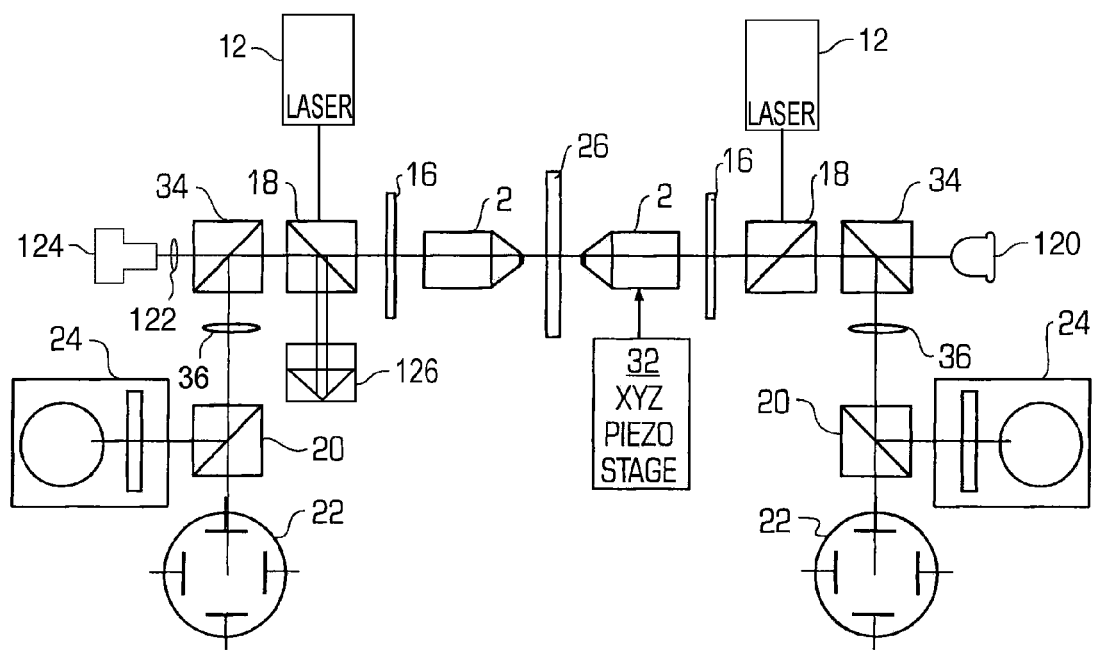
FIG. 12 is a diagram illustrating an improved configuration for viewing the experimental area of the force-measuring optical trap apparatus.

FIG. 12 illustrates a technique for viewing the experimental area (i.e. the fluid chamber 26) of the counter-propagating optical traps, to better allow for the efficient alignment of the two foci in the fluid chamber 26. As described above, counter-propagating beams from the two lasers 12 are directed through objective lenses 2 to form two laser trap foci at a common focal plane inside the fluid chamber 26. Beams emerging from the opposite sides of the traps are collected by opposing objective lenses 2. The quarter-wave retarder plates 16 and the polarizing beam-splitters 34 direct the beams to the momentum flux detectors (i.e. the power deflection/concentration detectors 22/24). With this embodiment, the fluid chamber 26 is illuminated by light generated by a light source 120 (e.g. blue light from a blue LED). The polarizing beam splitters 18/34 are optically coated or otherwise tuned to operate with 830 nm light (near-infrared), and thus designed to pass the blue light without polarizing it. Therefore, the blue light passes through the polarizing beam splitters 18/34, the quarter waveplates 16, the objective lenses 2, the fluid chamber 26 (thus illuminating it), a focusing lens 122, and on to a camera 124 (e.g. model 902C camera from Watec America Corporation). Thus, the illumination of the fluid chamber 26 with blue light aids in the visualization and the alignment of the laser foci.

The foci of both lasers 12 in the fluid chamber 26 are also visible to the camera 124. Specifically, light from the far-side laser 12 (on side of fluid chamber 26 furthest away from camera 124) is visible to (and reaches) camera 124 because at least some of this light leaks through the near-side polarizing beam splitter 34 (on side of fluid chamber 26 nearest the camera 124). Light from the near-side laser 12 is directed away from the camera 124 by polarizing beam splitter 18 (and would otherwise not reach camera 124). Therefore, a corner prism retro-reflector 126 is positioned to capture the leakage of this light through the near-side polarizing beam splitter 18, where the light is reflected by the retro-reflector 126 so that it comes back, hits the back side of the near-side polarizing beam splitter 18, and is reflected towards the camera 124. That light is focused as a point on the camera 124 as though it were coming from a focus imaged by the near-side objective lens 2. Indeed the light spot from the retro-reflector 126 sits at a place on the camera 124 that accurately represents the position of the beam focus (of near-side laser 12) that is directed away from the camera. This configuration aids in the alignment of the system (done by moving piezo stage 32 and fluid chamber 26) because the blue light illumination of the fluid chamber 26, the near-side focus from the near-side laser 12, and the far side focus from the far-side laser 12, are all captured by the camera 124.

Figure 13:
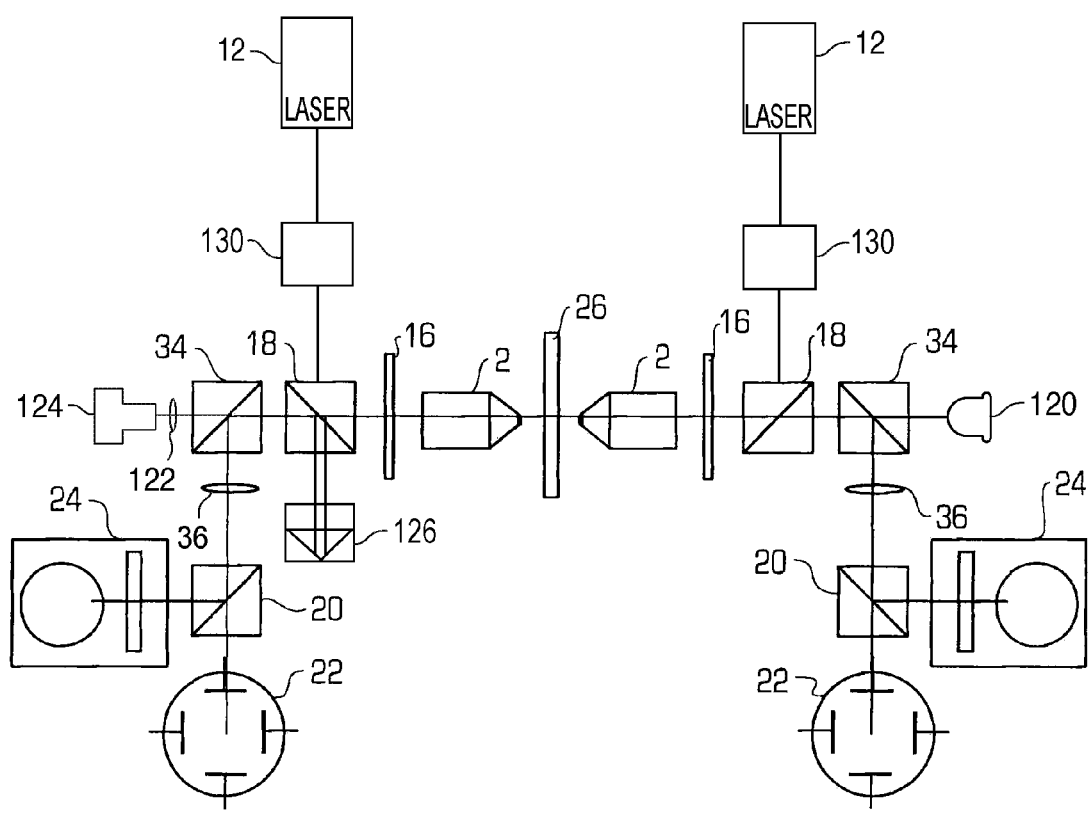
FIG. 13 is a diagram illustrating an improved configuration for viewing the experimental area of the force-measuring optical trap apparatus and for moving the optical beams.

FIG. 13 better illustrates the advantages of using the retro-reflector 126, which allows the operator to not only perform an initial alignment, but also allows the operator to align the beams during operation of the optical trap. FIG. 13 is the same as FIG. 12, but with the addition of beam deflectors 130 that deflect the beams incident on polarizing beam splitters 18 and/or change their focal points, and piezo stage 32 has been removed because it is no longer needed for alignment given the inclusion of beam deflectors 130. Any appropriate beam deflection device and/or device that changes the collimation of the beam can be used as beam deflectors 130, including, as one non-limiting example, the actuators 56 (e.g. piezo-electric devices) that move the delivery ends 62 of the optical fibers 46 as illustrated in FIG. 12. Without retro-reflector 126, the camera 124 sees no light from the beam traveling away from it, and thus the operator does not know where to steer that beam since he or she cannot see it. In the configuration of FIG. 13, the retro-reflector 126 and camera lens 122 form a pseudo-image of the trap focus in the camera 124 for the beam traveling away from the camera, which moves like the real trap focus (when that beam is steered) and changes its apparent depth like the real trap focus does (when that beam's collimation is changed). In practice, the operator views both the pseudo-image of the focus (via the retro-reflector), and also the image of real objects in the experimental (i.e. the fluid chamber 26) which are illuminated by light source 120. Thus, the operator can then steer the beam traveling away from the camera 124 to make the trap focus fall on a real object. Alternately, the pseudo-image can be steered to lie on top of the focus for the beam traveling toward the camera 124 such that the two traps will coincide in space and form the dual counter-propagating trap. Thus, the configuration of FIG. 13 not only aids the operator in initial alignment, but also in the alignment of the system during operation as one or both of the counter-propagating beams are deflected and/or are subjected to a focus change.

It is to be understood that the present invention is not limited to the embodiment(s) described above and illustrated herein, but encompasses any and all variations falling within the scope of the appended claims. For example, beam alignment via a pivoting optical fiber as described herein is not limited to optical trap applications. As used herein, collimating lenses or lenses that collimate simply make a diverging or converging light beam more collimated, and do not necessarily make the resulting light beam perfectly collimated. Therefore, as used herein, a collimated beam is one that is less diverging/converging than it was before passing through a collimating lens. A single lens could include a plurality of lenses, and vice versa. While actuators 56 are preferably piezo-electric devices, they could be any conventional mechanical device for moving or applying force onto the optical fiber. The generally rigid portions of optical fiber 46 between the pivot point X and the optical fiber output end 62 need not necessarily be straight, but should be sufficiently rigid to preserve the exit angle of the beam relative to the optical fiber as the optical fiber pivots. The screen 64 could be replaced by a ledge, an eyelet, a constricted end, or simply omitted altogether (should the end of outer tube 60 sufficiently control the rigid portion of the optical fiber). For the above described equations and the single or dual beam device of FIG. 3, one in the art will appreciate that if the focal lengths $R_L$ of the collection lenses are unequal, or the power responsitivities $\Psi$ of the power deflection detectors 22 are unequal, or the power responsitivities $\Psi'$ of the power concentration detectors 22 are unequal, or the half-width of the square area $R_D$ of the power deflection detectors 22 are unequal, then the equations discussed above can be expanded accordingly. For example, equation 6a ($F_x = (\Delta X_1 + \Delta X_2) R_D / c \Psi R_L$) is a short hand expression for $F_x = \Delta X_1 R_{D1} / c \Psi_1 R_{L2} + \Delta X_2 R_{D2} / c \Psi_2 R_{L1}$, and equation 6b ($F_y = (\Delta Y_1 + \Delta Y_2) R_D / c \Psi R_L$) is a short hand expression for $F_y = \Delta Y_1 R_{D1} / c \Psi_1 R_{L2} + \Delta Y_2 R_{D2} / c \Psi_2 R_{L1}$, to accommodate any unequal characteristics of the first and second lenses 2, first and second power deflection detectors 20, and first and second power concentration detectors 24. For differing focal length objective lenses, the patterned attenuators 28 may need to be different as well. The portion of optical fiber 46 between the pivot point X and the optical fiber output end 62 need not be straight, but should be rigid to preserve the exit angle of the beam from the optical fiber. If the above described detectors are not nulled by centering them on the beam, then nulling can be performed by subtracting from the signals that portion of the signal that exists caused by the non-centered beam (i.e. measure signal using light beam without particle in trap, or from particle in trap with no forces thereon). A single laser device could produce the pair of counter-propagating light beams (e.g. by using a beam splitter), instead of two light sources shown in FIG. 3. Lastly, the solutions from any of the various embodiments described herein can be added to each other as appropriate. Specifically, the techniques for moving the optical fiber shown in FIGS. 6A-6B, 7A-7B, and/or 8, the technique of active feedback control of fiber position shown in FIG. 11, and/or the technique of experimental area illumination shown in FIG. 12, can be combined as needed.

What is claimed is:

1. An optical trap device for trapping a particle, the device comprising:

at least one laser light source for generating first and second light beams;

first and second lenses for focusing the first and second light beams respectively to a trap region in a counter-propagating manner for trapping the particle in the trap region;

a first detector for measuring changes in a power deflection and in a power concentration of the first light beam leaving the trap region;

a second detector for measuring changes in a power deflection and in a power concentration of the second light beam leaving the trap region;

a light source for illuminating the trap region with a third beam of light; and a camera positioned for capturing a portion of each of the first, second and third light beams;

a first optical element for directing the first light beam to the first lens, wherein at least some of the second light beam leaving the trap region passes through the first optical element, and wherein the third light beam portion passes through the first optical element;

a second optical element for directing the second light beam to the second lens, wherein the first and third light beam portions pass through the second optical element;

wherein some of the second light beam leaks through the second optical element and is reflected back toward the second optical element by a reflective optical element, and wherein the reflected light is directed by the second optical element toward the camera as the second light beam portion.

2. The optical trap device of claim 1, wherein the first and third light beam portions captured by the camera have passed through the trap region, and wherein the second light beam portion captured by the camera has not passed through the trap region.

3. The optical trap device of claim 2, further comprising:
a third lens for focusing the second light beam portion onto the camera such the second light beam portion is focused as a point on the camera in the same manner as if the second light beam portion was originating from a focus in the trap region imaged by the first lens.

4. The optical trap device of claim 1, wherein:
the first detector includes a first power deflection detector and a first power concentration detector; and
the second detector includes a second power deflection detector and a second power concentration detector.

5. The optical trap device of claim 1, further comprising:
a processor for calculating a transverse force on the particle based upon the measured changes in the power deflections of the first and second light beams, and for calculating a longitudinal force on the particle based upon the measured changes in the power concentrations of the first and second light beams.

6. The optical trap device of claim 1, further comprising:
a support member;
an optical fiber having an input end for receiving the first light beam and an output end having a generally rigid portion extending from the first support member for emitting the first light beam toward the trap region;
at least one actuator for exerting a force on the generally rigid portion such that the generally rigid portion pivots about a pivot point of the optical fiber at the support member.

7. The optical trap device of claim 6, further comprising:
a beam splitting optical element for reflecting a portion of the first light beam emitted by the optical fiber to a position sensitive detector, wherein the position sensitive detector measures a position of the emitted first light beam and generates a position signal in response to the measured position;

an actuator driver that provides a drive signal to the at least one actuator for exerting the force, wherein the actuator driver receives the position signal and adjusts the drive signal in response to the received position signal.

8. An optical trap device for trapping a particle, the device comprising:
at least one laser light source for generating first and second light beams;

first and second lenses for focusing the first and second light beams respectively to a trap region in a counter-propagating manner for trapping the particle in the trap region;

a first detector for measuring changes in a power deflection and in a power concentration of the first light beam leaving the trap region;

a second detector for measuring changes in a power deflection and in a power concentration of the second light beam leaving the trap region;

a support member;

an optical fiber having an input end for receiving the first light beam and an output end having a generally rigid portion extending from the first support member for emitting the first light beam toward the trap region;

at least one actuator for exerting a force on the generally rigid portion such that the generally rigid portion pivots about a pivot point of the optical fiber at the support member;

a beam splitting optical element for reflecting a portion of the first light beam emitted by the optical fiber to a position sensitive detector, wherein the position sensitive detector measures a position of the emitted first light beam and generates a position signal in response to the measured position; and an actuator driver that provides a drive signal to the at least one actuator for exerting the force, wherein the actuator driver receives the position signal and adjusts the drive signal in response to the received position signal;

a light source for illuminating the trap region with a third beam of light; and a camera positioned for capturing a portion of each of the first, second and third light beams;

a first optical element for directing the first light beam to the first lens, wherein at least some of the second light beam leaving the trap region passes through the first optical element, and wherein the third light beam portion passes through the first optical element;

a second optical element for directing the second light beam to the second lens, wherein the first and third light beam portions pass through the second optical element;

wherein some of the second light beam leaks through the second optical element and is reflected back toward the second optical element by a reflective optical element, and wherein the reflected light is directed by the second optical element toward the camera as the second light beam portion.

9. The optical trap device of claim 1, wherein the reflective optical element is a retro-reflector.

10. The optical trap device of claim 1, wherein the reflective optical element is a corner prism.

11. The optical trap device of claim 8, wherein the reflective optical element is a retro-reflector.

12. The optical trap device of claim 8, wherein the reflective optical element is a corner prism.

13. An optical trap device for trapping a particle, the device comprising:
- a first light source for generating a light beam;
- a lens for focusing the light beam to a trap region for trapping the particle in the trap region;
- a second light source for illuminating the trap region with illumination light;
- a camera positioned for capturing a portion of the light beam and a portion of the illumination light;
- an optical element configured to direct the light beam to the lens, wherein some of the light beam leaks through the optical element and is reflected back toward the optical element by a reflective optical element, and wherein the reflected light is directed by the optical element toward the camera as the light beam portion.

14. The optical trap device of claim 13, wherein the reflective optical element is a retro-reflector.

15. The optical trap device of claim 13, wherein the reflective optical element is a corner prism.

16. The optical trap device of claim 13, wherein the portion of the illumination light captured by the camera passes through the optical element.

17. The optical trap device of claim 13, further comprising:
- a detector for measuring changes in a power deflection and in a power concentration of the light beam leaving the trap region.

* * * * *